United States Patent
Suyama

(10) Patent No.: US 9,329,301 B2
(45) Date of Patent: May 3, 2016

(54) RADIATION DETECTING DEVICE

(75) Inventor: Toshiyasu Suyama, Hamamatsu (JP)

(73) Assignee: HAMAMATSU PHOTONICS K. K., Hamamatsu-shi, Shizuoka (JP)

(*) Notice: Subject to any disclaimer, the term of this patent is extended or adjusted under 35 U.S.C. 154(b) by 757 days.

(21) Appl. No.: 13/391,059

(22) PCT Filed: Jun. 29, 2010

(86) PCT No.: PCT/JP2010/061060
§ 371 (c)(1), (2), (4) Date: Feb. 17, 2012

(87) PCT Pub. No.: WO2011/033841
PCT Pub. Date: Mar. 24, 2011

(65) Prior Publication Data
US 2012/0145911 A1    Jun. 14, 2012

(30) Foreign Application Priority Data

Sep. 18, 2009   (JP) ................... 2009-217536

(51) Int. Cl.
*G01T 1/20* (2006.01)
*G01V 5/00* (2006.01)

(52) U.S. Cl.
CPC ...................... *G01V 5/005* (2013.01)

(58) Field of Classification Search
USPC ..................... 250/366, 367, 370.11
See application file for complete search history.

(56) References Cited

U.S. PATENT DOCUMENTS 4,109,152 A * 8/1978 Aoki et al. ................. 250/486.1
4,626,688 A * 12/1986 Barnes ...................... 250/361 R
4,872,188 A    10/1989 Lauro et al.
5,878,108 A    3/1999 Baba et al.
6,002,810 A    12/1999 Wakisawa et al.
(Continued)

FOREIGN PATENT DOCUMENTS

EP    2 400 318    12/2011
JP    61-143038    6/1986
(Continued)

OTHER PUBLICATIONS

Wang et al. X-ray image intensifier tubes using rare earth oxysulfide phosphors, IEEE Transactions on Nuclear Science, vol. 17, No. 1 (Feb. 1970), pp. 49-56.*

(Continued)

*Primary Examiner* — David Porta
*Assistant Examiner* — Shun Lee
(74) *Attorney, Agent, or Firm* — Drinker Biddle & Reath LLP

(57) ABSTRACT

A radiation detection device 80 according to an embodiment of the present invention is a radiation detection device for a foreign substance inspection using a subtraction method, and includes a first radiation detector 32 that detects radiation in the first energy range transmitted through a specimen; and a second radiation detector that detects radiation in the second energy range higher than the radiation in the first energy range, and the thickness of a first scintillator layer 322 of the first radiation detector 32 is smaller than the thickness of a second scintillator layer 422 of the second radiation detector 42, and a first area S1 of each pixel 326 in a first pixel section 324 of the first radiation detector 32 is smaller than a second area S2 of each pixel 426 in a second pixel section 424 of the second radiation detector 42.

6 Claims, 13 Drawing Sheets

(56) References Cited

U.S. PATENT DOCUMENTS

| | | | |
|---|---|---|---|
| RE37,536 E | 2/2002 | Barnes | |
| 6,600,805 B2 | 7/2003 | Hansen | |
| 2002/0168046 A1 | 11/2002 | Hansen | |
| 2004/0013224 A1 | 1/2004 | Baba et al. | |
| 2005/0017184 A1* | 1/2005 | Groh et al. | 250/367 |
| 2007/0057208 A1 | 3/2007 | Joss et al. | |
| 2007/0114426 A1 | 5/2007 | Tkaczyk | |
| 2008/0062174 A1 | 3/2008 | Wedel | |
| 2010/0067822 A1 | 3/2010 | Young | |

FOREIGN PATENT DOCUMENTS

| | | |
|---|---|---|
| JP | 4-2907 | 1/1992 |
| JP | 5-68674 | 9/1993 |
| JP | 7-72257 | 3/1995 |
| JP | 2002-365368 | 12/2002 |
| JP | 2006-502386 | 1/2006 |
| JP | 2008-538966 | 11/2008 |
| JP | 2009-082250 | 4/2009 |
| JP | 2009-85627 | 4/2009 |
| JP | 2009-85844 | 4/2009 |
| JP | 2009-85845 | 4/2009 |
| JP | 2009-094902 | 4/2009 |
| JP | 2010-117170 | 5/2010 |
| JP | 2010-117172 | 5/2010 |
| JP | 2010-190830 | 9/2010 |
| JP | 2011-064643 | 3/2011 |
| TW | 200801571 | 1/2008 |
| TW | 200842393 | 11/2008 |

OTHER PUBLICATIONS

Machine Translation of JP 2009-85627.

* cited by examiner

Fig.5
(a)
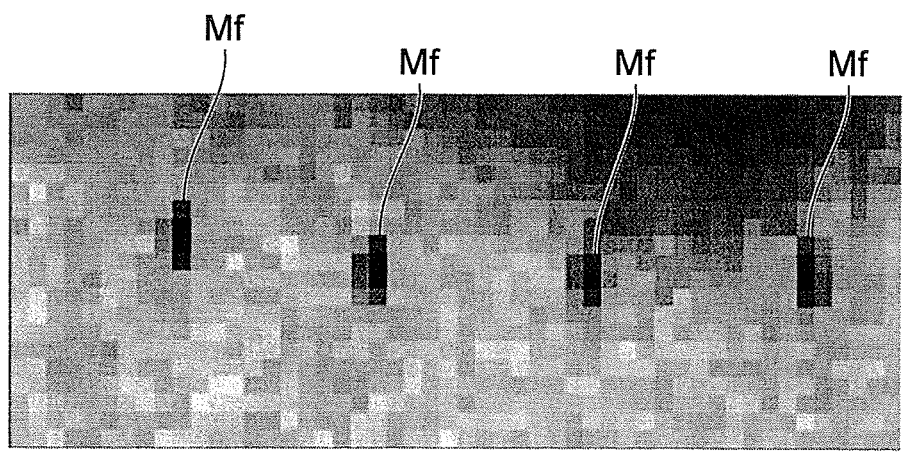
(b)
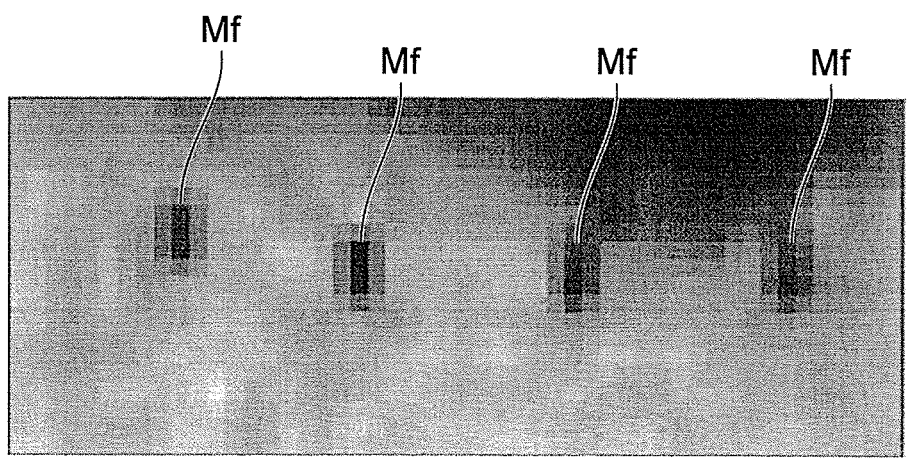

Fig.6
(a)
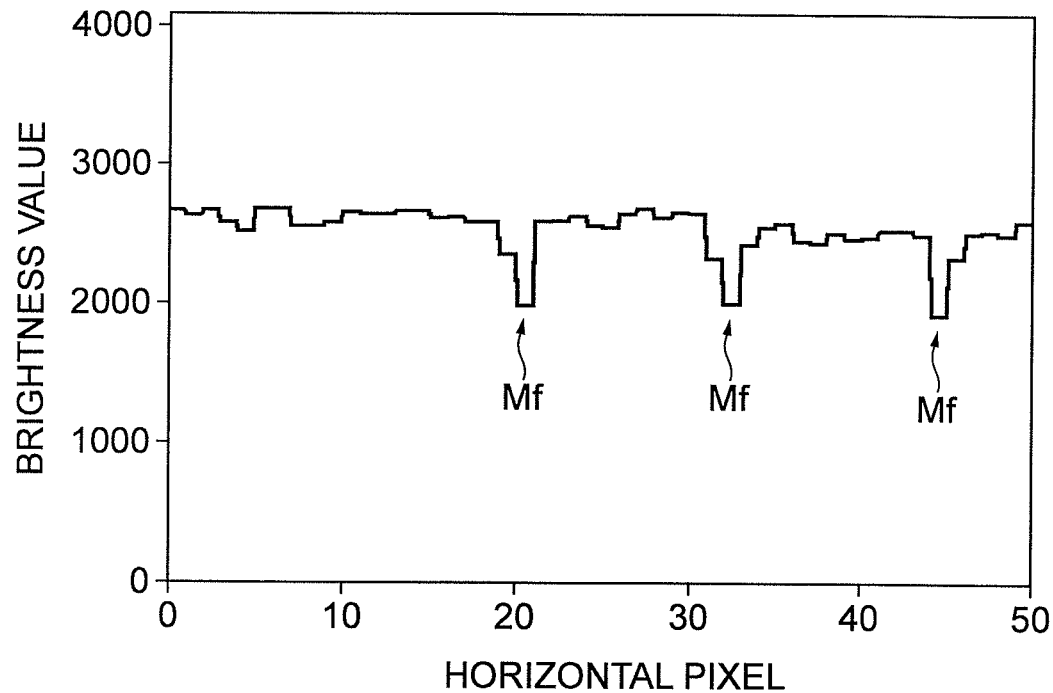
(b)
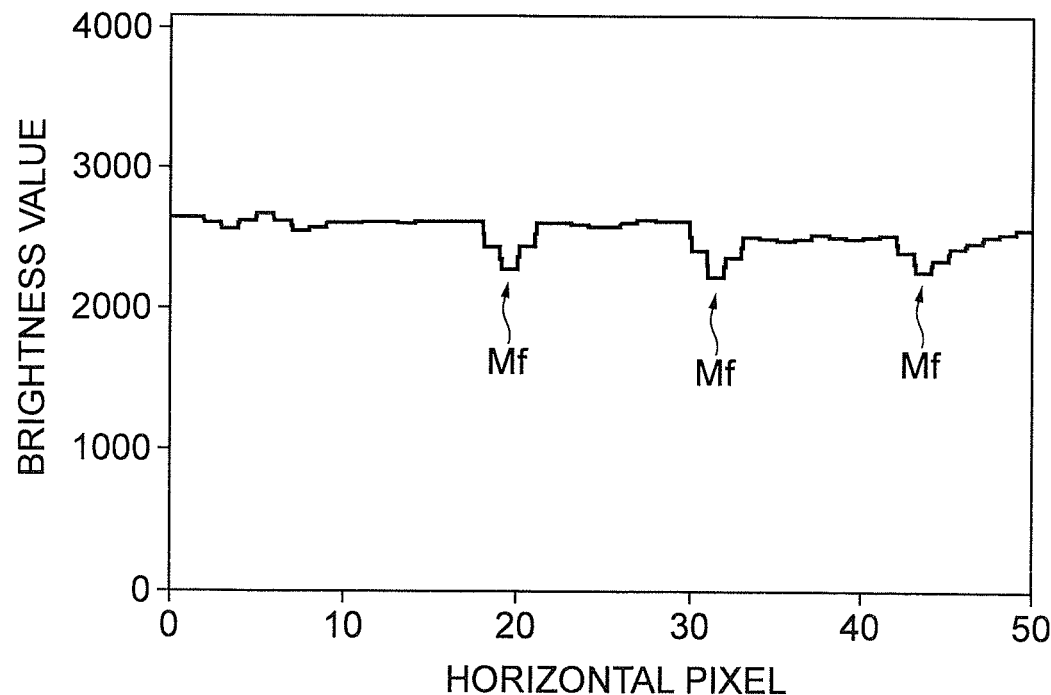

Fig.8
(a)
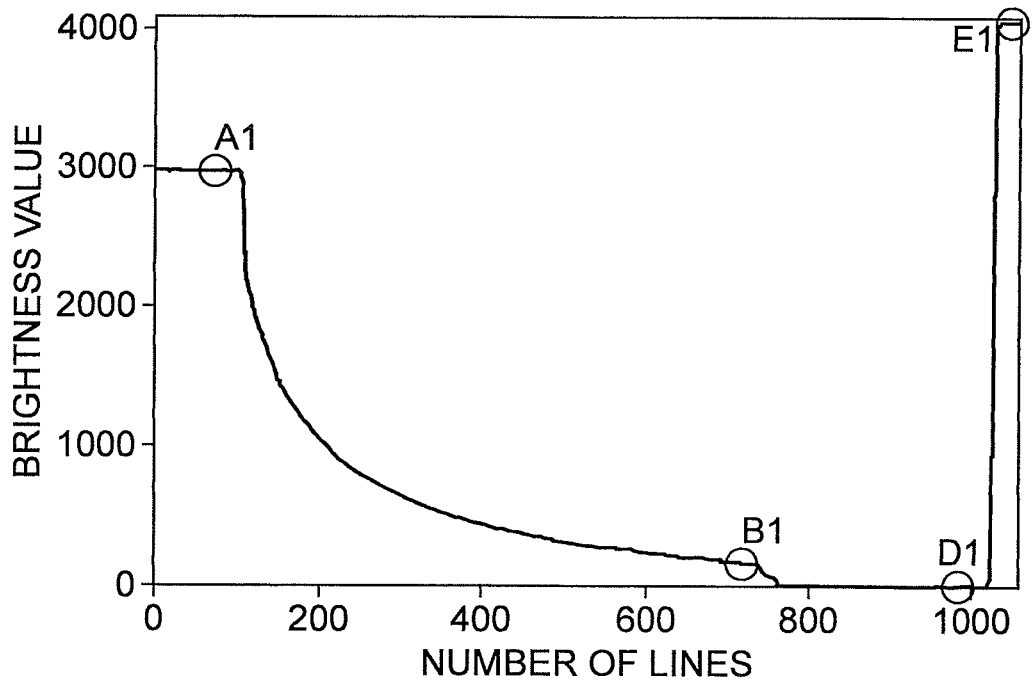
(b)
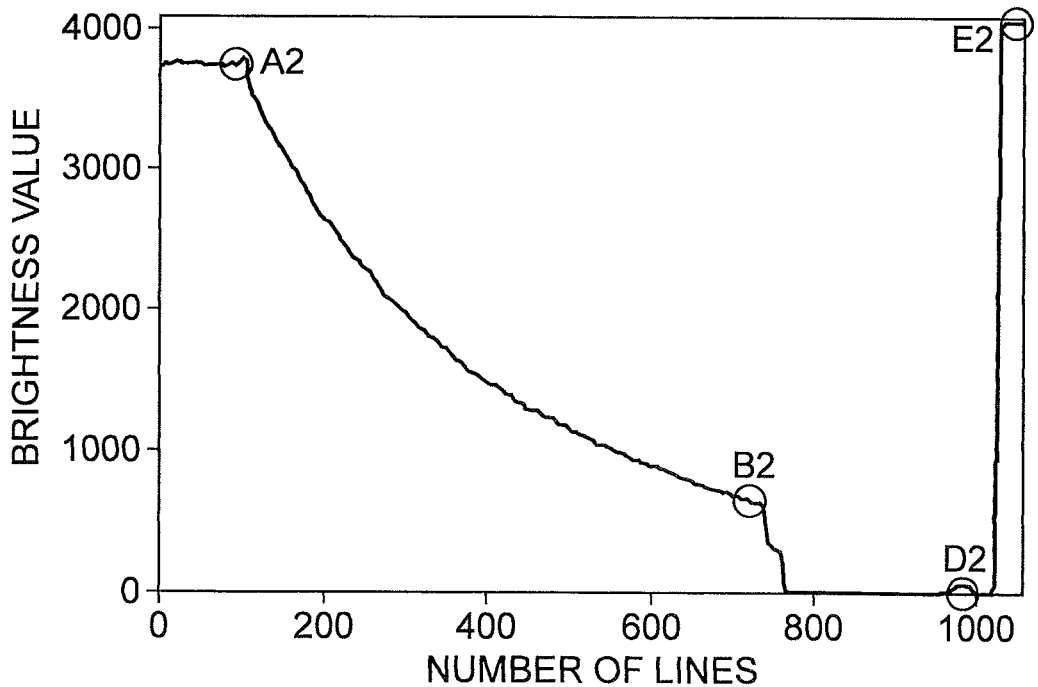

Fig.9
(a)
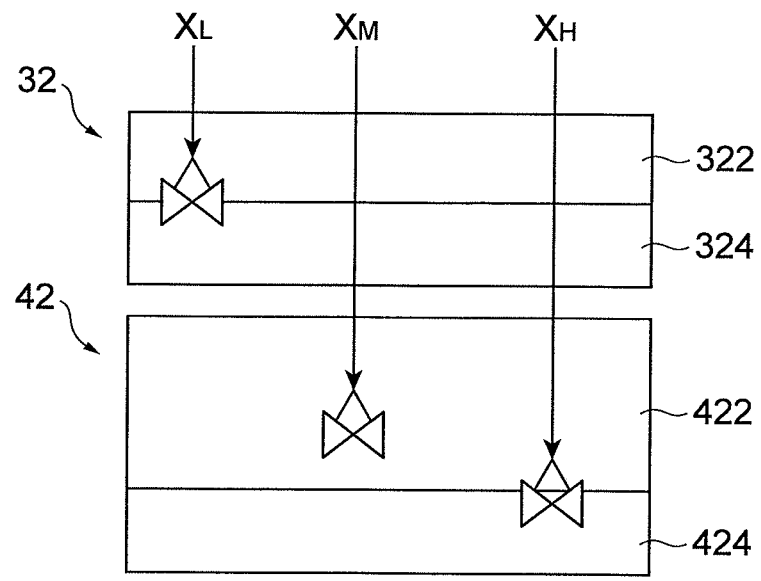
(b)
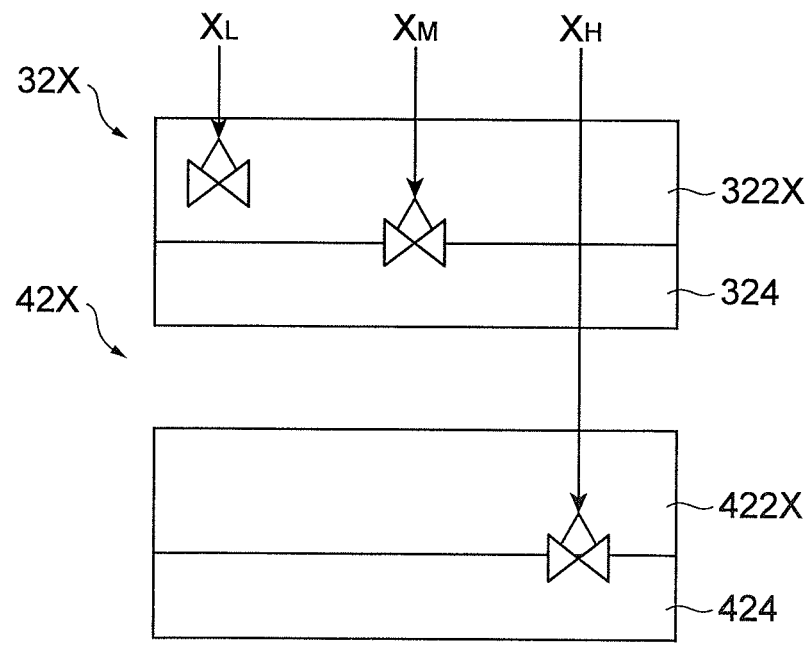

RADIATION DETECTING DEVICE

TECHNICAL FIELD

The present invention relates to a dual-energy radiation detection device.

BACKGROUND ART

A dual-energy radiation detection device includes two radiation detectors with different energy sensitivities, and detects radiation in a low-energy range (first energy range) and radiation in a high-energy range (second energy range) transmitted through a specimen. The radiation detectors have scintillator layers and pixels and generate a radiation image in the low-energy range and a radiation image in a high-energy range, respectively. With this radiation detection device, by simultaneously acquiring these radiation images and creating an image to which weighted subtraction processing and superimposition processing (for example, subtraction processing), etc., are applied based on these radiation images, detection of foreign substances, measurement of a component distribution, and measurement of weights, etc., can be realized with high accuracy in an in-line non-destructive inspection of a specimen that is conveyed by a belt conveyor, etc.

Radiation detection devices of this type are disclosed in Patent Literatures 1 and 2. In a baggage inspection device described in Patent Literature 1, a pixel width in a direction perpendicular to a pixel array direction in a high energy radiation detector is longer than a corresponding pixel width in a low energy radiation detector. Accordingly, beam levels of the low energy radiation detector and the high energy radiation detector can be made equivalent to each other. In the radiation detection device in X-ray CT described in Patent Literature 2, by using trapezoid radiation detectors, a pixel width in a direction perpendicular to a pixel array direction in the high energy radiation detector is made longer than a corresponding pixel width in a low energy radiation detector. Accordingly, radiation incidence amounts in the low energy radiation detector and the high energy radiation detector can be made equal to each other.

CITATION LIST

Patent Literature

Patent Literature 1: Japanese Translation of PCT Application (Kohyo) No. 2006-502386
Patent Literature 2: Japanese Patent Application Laid-Open No. H05-68674

SUMMARY OF INVENTION

Technical Problem

For example, in an inspection of foreign substances in foods, it is required to carry out an inspection to detect bone, cartilage, and metal, etc., in meat as a foreign substance, and by utilizing the difference in radiation absorption between meat and a foreign substance (bone, cartilage, and metal, etc.), based on a contrast difference in a subtraction image of radiation images transmitted through these, a foreign substance is made to stand out, and accordingly, it is determined whether a foreign substance is present.

Here, bone and metal differ greatly in radiotransparency from (lower in radiotransparency than) meat, so that a contrast difference in at least a radiation image acquired with one of the radiation detectors is great. As a result, a contrast difference in a subtraction image of the two radiation images is great, so that a foreign substance inspection can be easily carried out. However, cartilage, like meat, has high radiotransparency, and a difference in radiotransparency between these is small, so that the contrast differences in radiation images acquired with the radiation detectors become small. As a result, a contrast difference in a subtraction image of these radiation images also becomes small, so that the foreign substance inspection is difficult.

Therefore, as a result of repeated earnest considerations, the inventors of the present invention found that a contrast difference in a radiation image between lightweight atoms of meat and cartilage, etc., that is, between substances both having high radiotransparency could be made larger in a radiation image in a lower energy range. Further, the inventors of the present invention found that a contrast difference in a radiation image between heavy atoms of bone and metal, etc., that is, between substances both having low radiotransparency could be made larger in a radiation image in a higher energy range.

Specifically, an object of the present invention is to provide a radiation detection device that increases a contrast difference in a radiation image in a low-energy range to be detected by the low energy radiation detector and increases a detection energy difference between the low energy radiation detector and the high energy radiation detector.

Solution to Problem

A radiation detection device according to the present invention is a radiation detection device for a foreign substance inspection using a subtraction method, which detects radiation in a first energy range and radiation in a second energy range higher than the radiation in the first energy range that are transmitted through a specimen and incident from a radiation incident direction, comprising: a first radiation detector that is positioned on the upstream side with respect to the radiation incident direction and detects radiation in the first energy range; and a second radiation detector that is positioned on the downstream side with respect to the radiation incident direction and detects radiation in the second energy range. The first radiation detector includes a first scintillator layer that extends along an image detection direction and converts an image of radiation in the first energy range into an optical image, and a first pixel section that has a plurality of pixels arrayed along the image detection direction and acquires a first image based on the optical image converted by the first scintillator layer, and the second radiation detector includes a second scintillator layer that extends along the image detection direction and converts an image of radiation in the second energy range into an optical image, and a second pixel section that has a plurality of pixels arrayed along the image detection direction and acquires a second image based on the optical image converted by the second scintillator layer. The thickness of the first scintillator layer is smaller than the thickness of the second scintillator layer, and a first area of each of the plurality of pixels in the first pixel section is smaller than a second area of each of the plurality of pixels in the second pixel section.

With this radiation detection device, the area of each pixel in the first pixel section of the first radiation detector (low energy radiation detector) is comparatively small, so that even when a difference between radiation amounts transmitted through lightweight atoms of meat and cartilage, etc., that is, substances both having high radiotransparency is small, a difference in charge amount converted by each pixel becomes relatively large. Thus, by making the difference in charge amount converted by each pixel relatively large, a contrast difference between foreign substances such as cartilage and the periphery such as meat around the foreign substance can be increased. Specifically, a contrast difference in a radiation image in a low-energy range to be detected by the first radiation detector can be increased.

Further, with this radiation detection device, the first scintillator layer of the first radiation detector is comparatively thin, so that radiation in a lower energy range can be detected by the first radiation detector, and the second scintillator layer of the second radiation detector (high energy radiation detector) is comparatively thick, so that radiation in a higher energy range can be detected by the second radiation detector. Specifically, a detection energy difference between the first radiation detector and the second radiation detector can be increased. As a result, not only can a contrast difference in a radiation image between lightweight atoms of meat and cartilage, etc., that is, between substances both having high radiotransparency be increased by the first radiation detector, but also a contrast difference in a radiation image between heavy atoms of bone and metal, etc., that is, between substances both having low radiotransparency can be increased by the second radiation detector.

A first image detection direction width in the image detection direction of each of the pixels in the first pixel section described above may be smaller than a second image detection direction width in the image detection direction of each of the pixels in the second pixel section described above.

With this radiation detection device, the first scintillator layer of the first radiation detector is comparatively thin, and the first image detection direction width of each of the pixels is comparatively small, so that spatial resolution can be increased, and crosstalk between pixels can be reduced. Thus, by increasing the spatial resolution of the first radiation detector, a contrast difference between foreign substances such as cartilage and a periphery such as meat around the foreign substance can be increased. Specifically, a contrast difference in a radiation image in the low-energy range to be detected by the first radiation detector can be increased.

In addition, a first orthogonal direction width in an orthogonal direction orthogonal to the image detection direction of each of the pixels in the first pixel section described above may be smaller than a second orthogonal direction width in the orthogonal direction of each of the pixels in the second pixel section.

The material of the first scintillator layer described above and the material of the second scintillator layer may be the same or different. By thus individually selecting the material of the first scintillator layer and the material of the second scintillator layer according to detection X-rays, the detection energy difference between the first radiation detector and the second radiation detector can be further increased.

Advantageous Effects of Invention

According to the present invention, a contrast difference in a radiation image in the low-energy range to be detected by the low energy radiation detector can be increased. Accordingly, for example, even a foreign substance whose radiotransparency is close to that of a specimen having high radiotransparency can be easily detected.

Further, according to the present invention, a detection energy difference between the low energy radiation detector and the high energy radiation detector can be increased. Accordingly, for example, not only can a foreign substance with high radiotransparency be easily detected, but also a foreign substance with low radiotransparency can be easily detected.

BRIEF DESCRIPTION OF DRAWINGS

FIG. 5 is a view showing examples of images of X-rays transmitted through a specimen including a foreign substance.

FIG. 6 is a diagram showing horizontal brightness profiles of the X-ray transmission images shown in FIG. 5.

FIG. 8 is a diagram showing brightness profiles of the X-ray transmission images shown in FIG. 7.

FIG. 9 is a schematic view showing ways of luminescence in the respective energy ranges in the low energy detector and the high energy detector.

DESCRIPTION OF EMBODIMENTS

Figure 1:
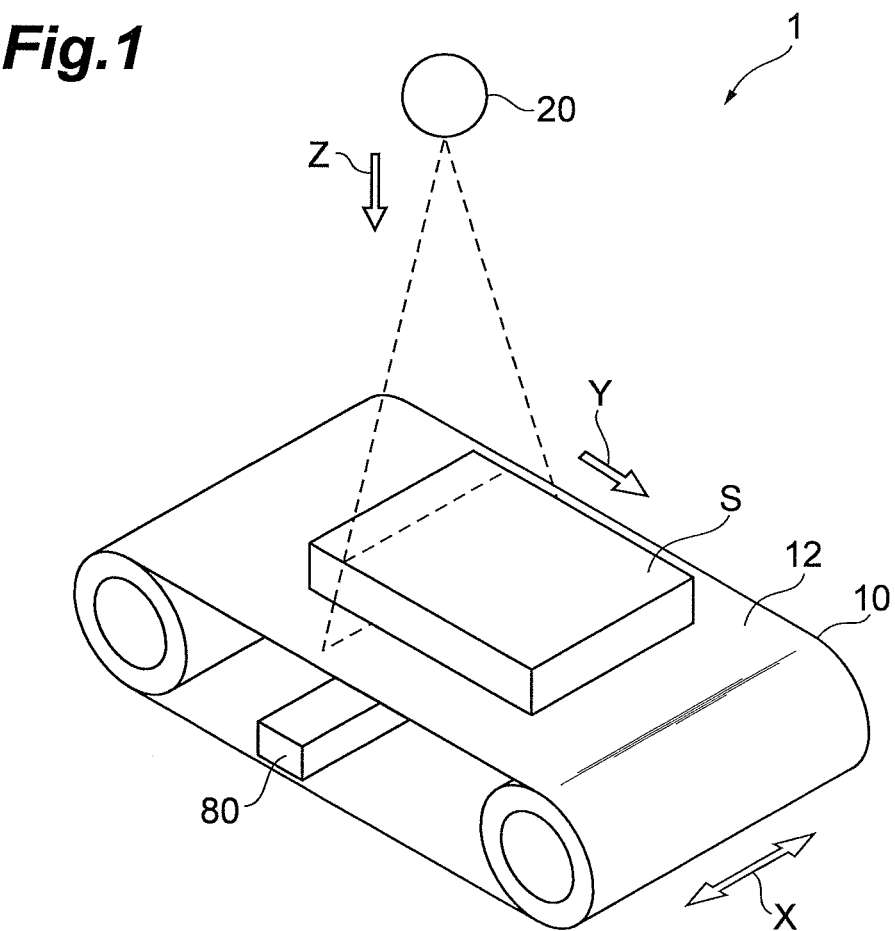
FIG. 1 is a perspective view of an X-ray foreign substance inspection device according to the present embodiment.

Hereinafter, a preferred embodiment of the present invention is described with reference to the drawings. In the drawings, portions identical to or equivalent to each other are designated by the same reference signs.

Figure 2:
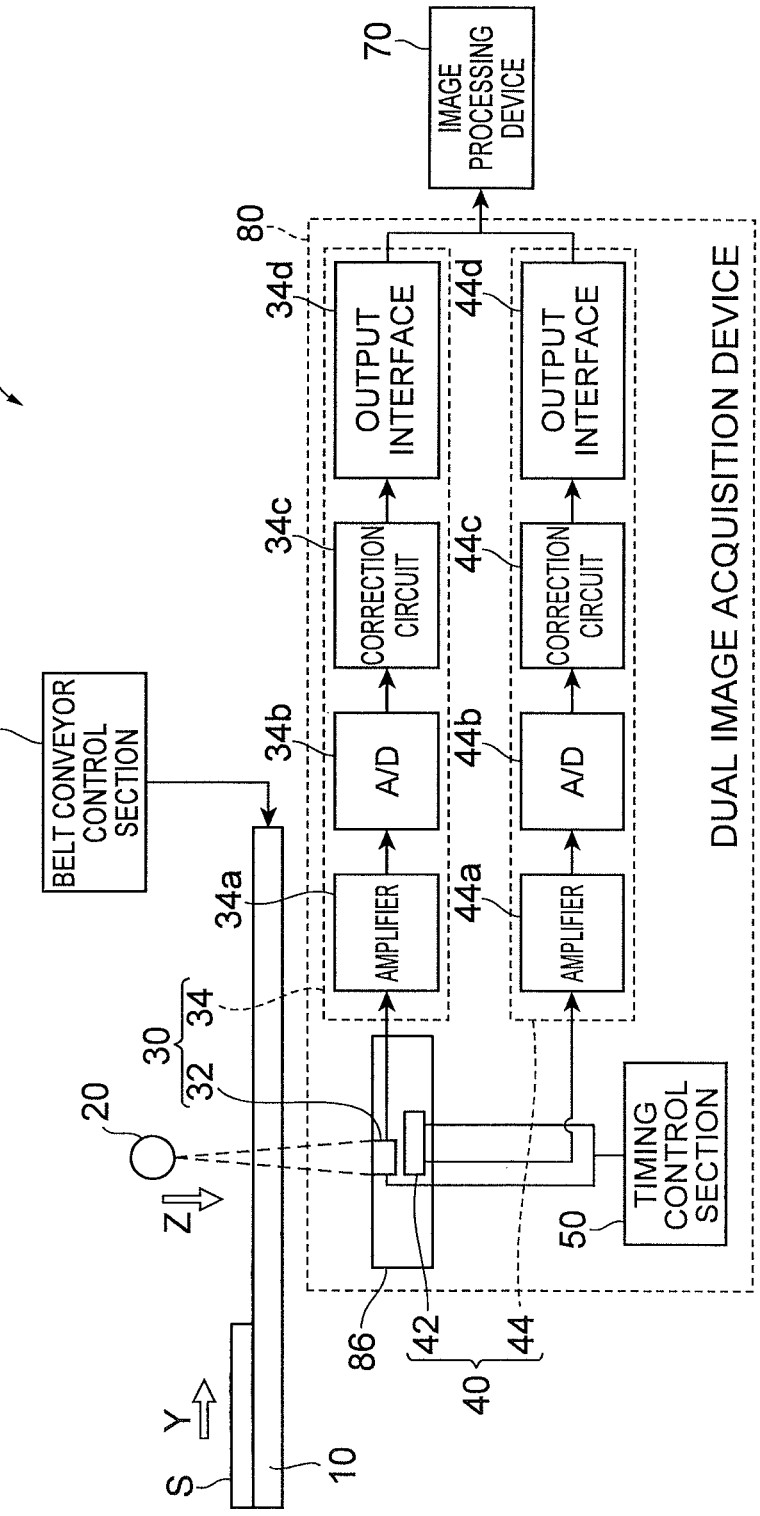
FIG. 2 is a schematic configuration view of the X-ray foreign substance inspection device according to the present embodiment.

FIG. 1 is a perspective view of an X-ray foreign substance inspection device according to the present embodiment, and FIG. 2 is a schematic configuration view of the X-ray foreign substance inspection device according to the present embodiment. As shown in FIG. 1 and FIG. 2, the X-ray foreign substance inspection device 1 irradiates X-rays (radiation) from an X-ray source onto a specimen S in an irradiation direction Z, and detects transmitted X-rays transmitted through the specimen S of the irradiated X-rays in a plurality of energy ranges. The X-ray foreign substance inspection device 1 carries out a foreign substance inspection and a baggage inspection for inspecting foreign substances included in a specimen S by using transmitted X-ray images. Such an X-ray foreign substance inspection device 1 includes a belt conveyor 10, an X-ray irradiator 20, a low energy image acquisition section 30, a high energy image acquisition section 40, a timing control section 50, and an image processing device 70. The low energy image acquisition section 30, the high energy image acquisition section 40, and the timing control section 50 constitute a dual-energy radiation detection device 80 according to an embodiment of the present invention.

The belt conveyor 10 includes a belt portion 12 on which a specimen S is placed as shown in FIG. 1. The belt conveyor 10 conveys the specimen S in a conveying direction Y at a predetermined conveying speed by moving the belt portion 12 in the conveying direction Y. The conveying speed of the specimen S is, for example, 48 m/min. The belt conveyor 10 can change the conveying speed to, for example, 24 m/min and 96 m/min by the belt conveyor control section 14 as appropriate. The belt conveyor control section 14 can change the height position of the belt portion 12. By changing the height position of the belt portion 12, the distance between the X-ray irradiator 20 and the specimen S can be changed. By this change, the resolution of X-ray transmitted images to be acquired with the low energy image acquisition section 30 and the high energy image acquisition section 40 can be changed. The specimen S to be conveyed by the belt conveyor 10 is composed of various objects, for example, foods such as meat, rubber products such as tires, baggage and cargo to be subjected to baggage inspections and cargo inspections for security and safety, and other resin products and metal products, resource materials such as mineral substances, waste to be separated and collected (recycled) as resources, and electronic components, etc.

The X-ray irradiator 20 is an X-ray source that irradiates X-rays in the irradiation direction Z onto the specimen S. The X-ray irradiator 20 is a point light source, and diffuses and irradiates X-rays in a predetermined angle range in a detection direction X orthogonal to the irradiation direction Z and the conveying direction Y. The X-ray irradiator 20 is disposed above the belt portion 12 at a predetermined distance to the belt portion 12 so that the X-ray irradiation direction Z is directed toward the belt portion 12 and X-rays diffuse to the entirety in the width direction (detection direction X) of the specimen S. The X-ray irradiator 20 has an irradiation range set to a predetermined divided region in the longitudinal direction (conveying direction Y) of the specimen S, and by conveying the specimen S in the conveying direction Y by the belt conveyor 10, X-rays are irradiated onto the entirety in the longitudinal direction of the specimen S.

The low energy image acquisition section 30 includes a low energy detector (first radiation detector) 32 and a low energy image correction section 34.

The low energy detector 32 is positioned on the upstream side with respect to the X-ray incident direction Z, and detects X-rays in a low-energy range (first energy range) transmitted through the specimen S of the X-rays irradiated from the X-ray irradiator 20 and generates low energy image data (first radiation image data).

The low energy image correction section 34 is a section that amplifies and corrects low energy image data generated by the low energy detector 32. The low energy image correction section 34 includes an amplifier 34a that amplifies low energy image data, an A/D converter 34b that A/D converts the low energy image data amplified by the amplifier 34a, a correction circuit 34c that applies predetermined correction processing to the low energy image data converted by the A/D converter 34b, and an output interface 34d that outputs the image data corrected by the correction circuit 34c to the outside.

The high energy image acquisition section 40 includes a high energy detector (second radiation detector) 42 and a high energy image correction section 44.

The high energy detector 42 is positioned on the downstream side with respect to the X-ray incident direction Z, and detects X-rays in a high-energy range (second energy range) transmitted through the specimen S and the low energy detector 32 of the X-rays irradiated from the X-ray irradiator 20 and generates high energy image data (second radiation image data). The low-energy range detected by the low energy detector 32 and the high-energy range detected by the high energy detector 42 are not clearly discriminated from each other, but overlap to some extent.

The high energy image correction section 44 amplifies and corrects high energy image data generated by the high energy detector 42. The high energy image correction section 44 includes an amplifier 44a that amplifies high energy image data, an A/D converter 44b that A/D converts high energy image data amplified by the amplifier 44a, a correction circuit 44c that applies predetermined correction processing to the high energy image data converted by the A/D converter 44b, and an output interface 44d that outputs image data corrected by the correction circuit 44c to the outside.

The timing control section 50 controls transmitted X-ray detection timings in the low energy detector 32 and transmitted X-ray detection timings in the high energy detector 42. The timing control section 50 reduces an image deviation in the following subtraction processing by making low energy image data and high energy image data correspond to each other.

The image processing device 70 is a device that generates a subtraction image as a synthesized image by carrying out arithmetic processing (subtraction processing) for calculating difference data between low energy image data detected and generated by the low energy detector 32 and high energy image data detected and generated by the high energy detector 42. The detection timings of both energy image data to be input into the image processing device 70 are controlled by the timing control section 50 so that both image data correspond to each other. The image processing device 70 outputs the subtraction image generated by the arithmetic processing to a display, etc., and displays it thereon. By this output display, foreign substances, etc., included in the specimen S can be visually confirmed. It is also possible that the subtraction image is not output and displayed but only data is output so that foreign substances, etc., included in the specimen S are directly detected from the image data by detection processing on the image data.

Figure 3:
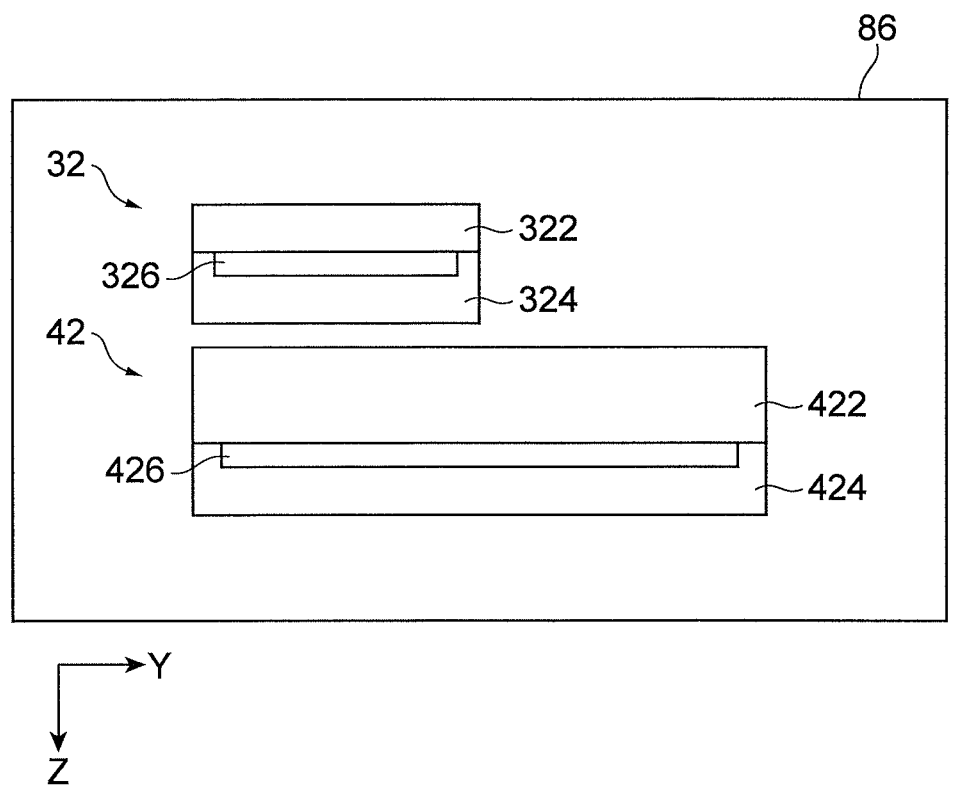
FIG. 3 is a schematic structural drawing of a dual-energy sensor in a radiation detection device according to an embodiment of the present invention.

Next, the low energy detector 32 and the high energy detector 42 are described in detail. FIG. 3 is a schematic structural drawing of a dual-energy sensor 86 consisting of the low energy detector 32 and the high energy detector 42 in the radiation detection device 80 shown in FIG. 2, and FIG. 4 is a drawing showing an X-ray incidence plane (a) of the low energy detector 32 and an X-ray incidence plane (b) of the high energy detector 42.

Figure 4:
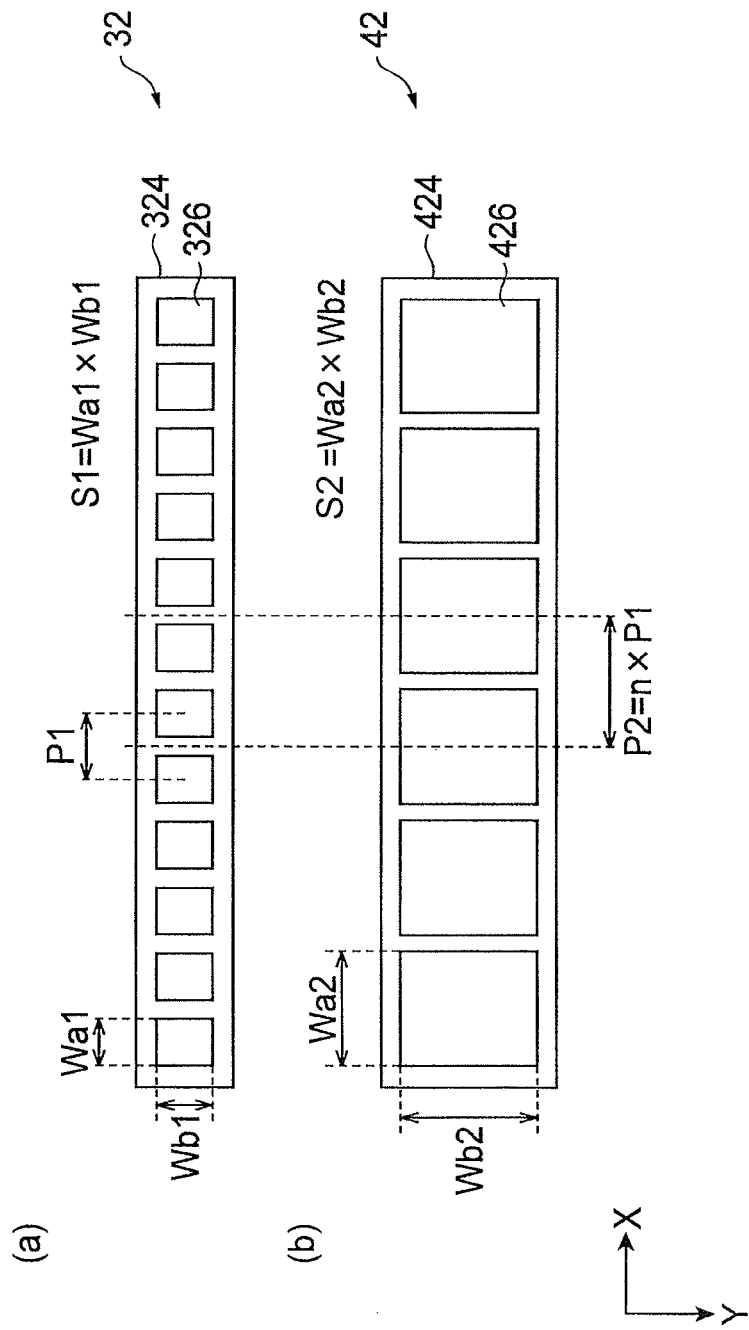
FIG. 4 is a drawing showing X-ray incidence planes of a low energy detector and a high energy detector in the dual-energy sensor shown in FIG. 3.

As shown in FIG. 3 and FIG. 4, the low energy detector 32 includes a low energy scintillator layer (first scintillator layer) 322 and a low energy line sensor (first pixel section) 324. The low energy scintillator layer 322 extends along the image detection direction X and converts an image of X-rays in the low-energy range into an optical image. The low energy line sensor 324 includes a plurality of pixels 326 arrayed along the image detection direction X, and acquires a low energy image (first image) based on the optical image converted by the low energy scintillator layer 322. Thus, the low energy detector 32 detects X-rays in the low-energy range.

Similarly, the high energy detector 42 includes a high energy scintillator layer (second scintillator layer) 422 and a high energy line sensor (second pixel section) 424. The high energy scintillator layer 422 extends along the image detection direction X and converts an image of X-rays in the high-energy range into an optical image. The high energy line sensor 424 includes a plurality of pixels 426 arrayed along the image detection direction X, and acquires a high energy image (second image) based on the optical image converted by the high energy scintillator layer 422. The high energy detector 42 thus detects X-rays in the high-energy range.

Here, the thickness of the low energy scintillator layer 322 of the low energy detector 32 is smaller than in a conventional dual-energy X-ray detection device, and the thickness of the high energy scintillator layer 422 of the high energy detector 42 is larger than in a conventional dual-energy X-ray detection device. Specifically, the thickness of the low energy scintillator layer 322 of the low energy detector 32 is smaller than the thickness of the high energy scintillator layer 422 of the high energy detector 42.

The pixel width (first image detection direction width) Wa1 in the image detection direction X of each of the plurality of pixels 326 in the low energy line sensor 324 is smaller than the pixel width (second image detection direction width) Wa2 in the image detection direction X of each of the plurality of pixels 426 in the high energy line sensor 424. The pixel width (first orthogonal direction width) Wb1 in the orthogonal direction (conveying direction Y) orthogonal to the image detection direction X of each of the plurality of pixels 326 in the low energy line sensor 324 is smaller than the pixel width (second orthogonal direction width) Wb2 in the orthogonal direction Y of each of the plurality of pixels 426 in the high energy line sensor 424. Specifically, the area (first area) S1 of each of the plurality of pixels 326 in the low energy line sensor 324 is smaller than the area (second area) S2 of each of the plurality of pixels 426 in the high energy line sensor 424.

Thus, the number of pixels per unit length of the high energy line sensor 424 and the number of pixels per unit length of the low energy sensor 342 are different from each other, and the number of pixels per unit length of the high energy line sensor 424 is smaller than the number of pixels per unit length of the low energy line sensor 342.

The pixel pitch P2 of the pixels 426 in the high energy line sensor 424 is preferably n times (n is a positive integer) the pixel pitch P1 of the pixels 326 in the low energy line sensor 324. For example, in subtraction processing, when the numbers of pixels in the image detection direction X are different, the numbers of pixels may be made equal to each other by applying processings such as thinning-out and interpolation to detected images, and when the pixel pitch is an integral multiple, processings such as thinning-out and interpolation can be easily applied to detected images.

The material of the low energy scintillator layer 322 and the material of the high energy scintillator layer 422 may be the same, however, it is also possible that the low energy scintillator layer 322 and the high energy scintillator layer 422 are made of different materials. For example, as materials of the low energy scintillator layer 322 and the high energy scintillator layer 422, Gd2O2S: Tb, CsI: TI, CdWO4, CaWO4, GSO, LGSO, BGO, LSO, YSO, YAP, Y2O2S: Tb, YTaO4: Tm, etc., are applicable, and a combination of the materials is selected according to X-rays to be detected.

Thus, with the radiation detection device 80 according to the present embodiment, the area of each pixel 326 in the low energy line sensor 324 of the low energy detector 32 is comparatively small, so that even when the difference between radiation amounts transmitted through lightweight atoms of, for example, meat and cartilage, etc., that is, substances both having high radiotransparency is small, a difference in charge amount converted by each pixel 326 becomes relatively large. With the radiation detection device 80 according to the present embodiment, the low energy scintillator layer 322 of the low energy detector 32 is comparatively thin, so that even when the area of each pixel 326 in the low energy line sensor 324 is small, that is, even when the pixel width Wa1 in the detection direction (pixel array direction) X of each pixel 326 is small, crosstalk between the pixels can be reduced, and spatial resolution can be increased. Thus, by increasing spatial resolution of the low energy detector 32, a contrast difference between a foreign substance such as a cartilage and a periphery such as meat around the foreign substance can be increased. Specifically, a contrast difference in a radiation image in a low-energy range to be detected by the low energy detector 32 can be increased.

With the radiation detection device 80 according to the present embodiment, the low energy scintillator layer 322 of the low energy detector 32 is comparatively thin, so that radiation in a lower energy range can be detected by the low energy detector 32, and the high energy scintillator layer 422 of the high energy detector 42 is comparatively thick, so that radiation in a higher energy range can be detected by the high energy detector 42. Specifically, a detection energy difference between the low energy detector 32 and the high energy detector 42 can be increased. As a result, not only a contrast difference in a radiation image between lightweight atoms of meat and cartilage, etc., that is, between substances both having high radiotransparency can be increased by the low energy detector 32, but also a contrast difference in a radiation image between heavy atoms of bone and metal, etc., that is, between substances both having low radiotransparency can be increased by the high energy detector 42.

By individually selecting the material of the low energy scintillator layer 322 and the material of the high energy scintillator layer 422 according to the detection X-rays, the detection energy difference between the low energy detector 32 and the high energy detector 42 can be further increased. Specifically, detection energy discrimination is further improved, so that a preferable subtraction image can be obtained.

Hereinafter, these operations and effects are considered.

First, results of evaluation on the area (pixel width) of each pixel 326 in the low energy line sensor 324 are described. FIG. 5 is a view showing an example of images of X-rays transmitted through a specimen S including a foreign substance, and FIG. 6 is a diagram showing horizontal brightness profiles of the X-ray images shown in FIG. 5.

The size of the foreign substance Mf in FIG. 5 is about one to four times as large as the pixel pitch of the line sensor that acquired the image of FIG. 5(a). The pixel pitch of the line sensor that acquired the image of FIG. 5(b) is about twice as large as the pixel pitch of the line sensor that acquired the image of FIG. 5(a).

According to the images of FIG. 5(a) and FIG. 5(b), while the brightness difference between the foreign substance portions Mf and the peripheral portion is approximately 6% in the image of FIG. 5(b), the brightness difference between the foreign substance portions Mf and the peripheral portion is increased to approximately 23% in the image of FIG. 5(a). Referring to the brightness profiles of FIG. 6(a) and FIG. 6(b), while the brightness difference between the foreign substance portions Mf and the peripheral portion is small (approximately several %) in the brightness profile of FIG. 6(b), the brightness difference between the foreign substance portions Mf and the peripheral portion is increased (to approximately 20% or more) in the brightness profile of FIG. 6(a). This shows that the contrast (brightness difference) can be made larger in the image of FIG. 5(a) acquired by using a line sensor with a smaller pixel pitch, that is, a line sensor using pixels with higher resolution than in the image of FIG. 5(b).

It is considered that the reason for this is because the charge amounts of pixels became smaller due to the pixel size reduction and resulted in the relatively larger charge amount difference between pixels. Accordingly, in the present embodiment, when the area of each pixel 326 in the low energy line sensor 324 of the low energy detector 32 is made comparatively small, even if a difference between radiation amounts transmitted through lightweight atoms of, for example, meat and cartilage, etc., that is, substances both having high radiotransparency is small, a difference in charge amount converted by each pixel 326 becomes relatively large.

Figure 7:
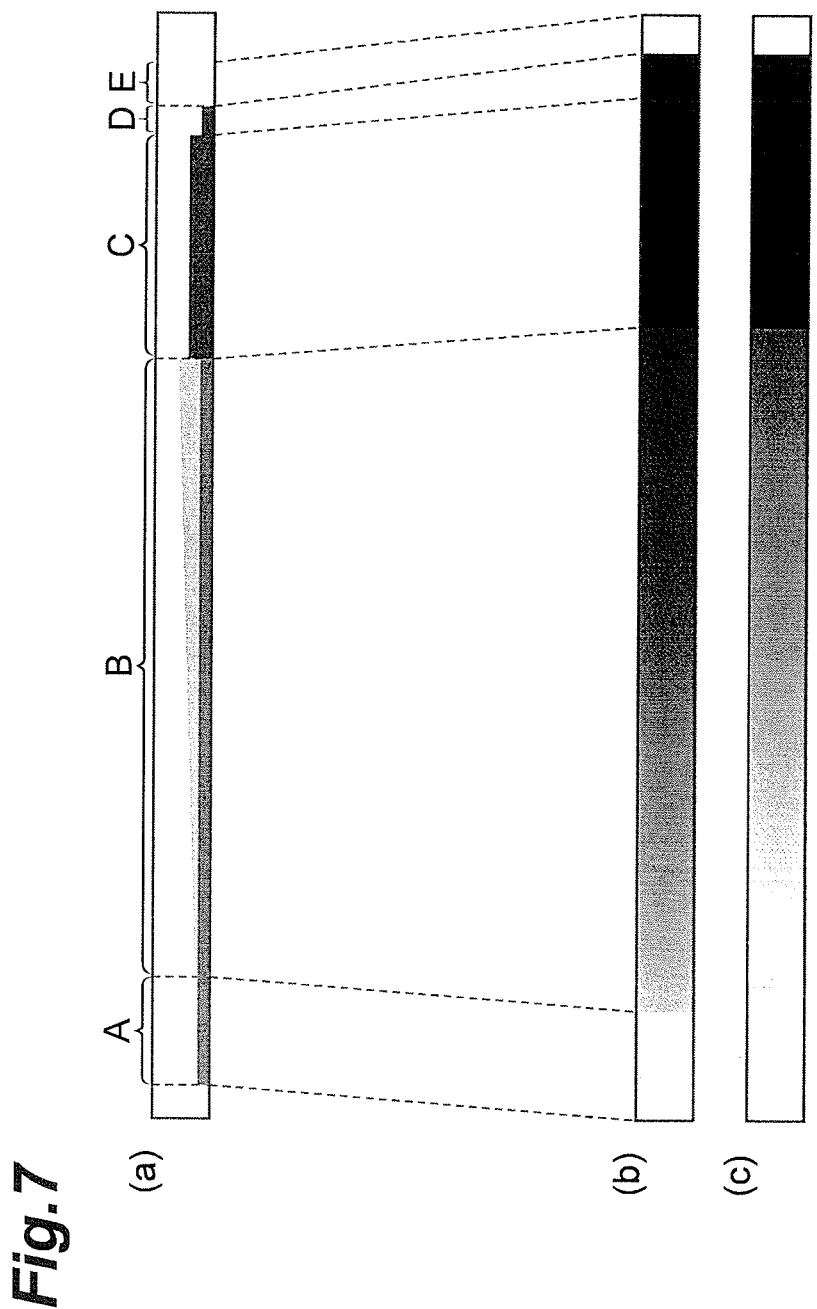
FIG. 7 is a diagram showing a specimen for evaluation and X-ray transmission images of this specimen.

Next, results of evaluation on the thickness of the low energy scintillator layer 322 of the low energy detector 32 and the thickness of the high energy scintillator layer 422 of the high energy detector 42 are described. FIG. 7 is a diagram showing a specimen for evaluation and X-ray transmission images of this specimen.

As shown in FIG. 7(a), the specimen for evaluation is made of the following different materials at the portions A to E.
Portion A: carbon
Portion B: carbon+aluminum (aluminum becomes gradually thicker from the portion A side to the portion B side)
Portion C: iron (thick)
Portion D: iron (thin)
Portion E: air
FIG. 7(b) shows an X-ray transmission image of the specimen, acquired only with the low energy detector 32 of the present embodiment having a thin scintillator layer, and FIG. 7(c) shows an X-ray transmission image of the specimen, acquired only with the high energy detector 42 of the present embodiment having a thick scintillator layer.

Referring to FIG. 7(b), in the low energy detector 32 of the present embodiment having the thin scintillator layer 322, a boundary between the carbon portion A with comparatively high X-ray transmittance and the portion A side of the carbon+aluminum portion B can be recognized according to a contrast difference (brightness difference). On the other hand, referring to FIG. 7(c), in the high energy detector 42 according to the present embodiment having the thick scintillator layer 422, a boundary between the portion C side of the carbon+aluminum portion B with comparatively low X-ray transmittance and the iron portion C can be recognized according to a contrast difference (brightness difference).

FIG. 8 is a diagram showing brightness profiles of the X-ray transmission images shown in FIG. 7. FIG. 8(a) shows a brightness profile of the X-ray transmission image shown in FIG. 7(b), and FIG. 8(b) shows a brightness profile of the X-ray transmission image shown in FIG. 7(c). The portions A1 and A2 correspond to the carbon portion A, the portions B1 and B2 correspond to the thick aluminum portion B, the portions D1 and D2 correspond to the iron (thin) portion D, and the portions E1 and E2 correspond to the air portion E.

Referring to FIG. 8(a), the brightness value of the carbon portion A1 differed by approximately 23% from the brightness value of the air portion E1. On the other hand, referring to FIG. 8(b), the brightness difference of the brightness value of the carbon portion A2 from the brightness value of the air portion E2 was approximately 10%. Based on this, the low energy detector 32 of the present embodiment having the thin scintillator layer 322 can increase the contrast difference between air and carbon that have comparatively high X-ray transmittances by twice or more the contrast difference in the high energy detector 42 having the thick scintillator layer 422. This shows that reduction in thickness of the scintillator layer (that is, as described later, detection of X-rays with lower energies) is important to increase a contrast difference between substances having comparatively high X-ray transmittances (that is, between soft atoms).

Referring to FIG. 8(a), the brightness difference of the brightness value of the aluminum (thick) portion B1 from the brightness value of the thin iron portion D1 was approximately 3%. On the other hand, referring to FIG. 8(b), the brightness difference of the brightness value of the aluminum (thick) portion B2 from the brightness value of the iron (thin) portion D2 was approximately 12%. Based on this, the high energy detector 42 of the present embodiment having the thick scintillator layer 422 can increase the contrast difference between iron and aluminum (thick) that have comparatively low X-ray transmittances by twice or more the contrast difference in the low energy detector 32 having the thin scintillator layer 322. This shows that an increase in thickness of the scintillator layer (that is, as described later, detection of X-rays with higher energies) is important to increase a contrast difference between substances with comparatively low X-ray transmittances (that is, hard atoms).

Referring to FIG. 8, a brightness difference between hard substances, detected by the low energy detector 32 having the thin scintillator layer 322, and a brightness difference between hard substances, detected by the high energy detector 42 having the thick scintillator layer 422 differ greatly, so that they can be easily extracted by subtraction. In addition, the brightness difference between hard substances is expressed to be great by the high energy detector 42 having the thick scintillator layer 422, so that a sufficient brightness difference can be secured even if the pixel pitch is large, that is, even without making the pixel pitch smaller as described above.

On the other hand, a brightness difference between soft substances, detected by the low energy detector 32 having the thin scintillator layer 322, and a brightness difference between the soft substances, detected by the high energy detector 42 having the thick scintillator layer 422, do not differ greatly from each other as compared with the hard substances, so that higher-resolution detection in the low energy detector 32 having the thin scintillator layer 322 is important. Therefore, as described above, the low energy detector 32 having the thin scintillator layer 322 is preferably combined with a line sensor 324 with a small pixel pitch. As described later, fluorescence scattering inside the thin scintillator layer is small, so that an image with high resolution can be obtained, and the thin scintillator layer is preferably combined with a line sensor with a small pixel pitch.

Here, this evaluation result is considered. FIG. 9 is a schematic drawing showing the ways of luminescence in the respective energy ranges in the low energy detector 32 and the high energy detector 42. FIG. 9(a) shows the low energy detector 32 and the high energy detector 42 of the present embodiment, and FIG. 9(b) is a low energy detector 32X and a high energy detector 42X of a comparative example.

The comparative example is different from the present embodiment in that the scintillator layer 322X of the low energy detector 32X and the scintillator layer 422X of the high energy detector 42X have thicknesses equivalent to each other. Specifically, the scintillator layer 322X of the low energy detector 32X of the comparative example is thicker than the scintillator layer 322 of the low energy detector 32 of the present embodiment, and the scintillator layer 422X of the high energy detector 42X of the comparative example is thinner than the scintillator layer 422 of the high energy detector 42 of the present embodiment.

As shown in FIG. 9(b), in the comparative example, an X-ray $X_L$ with lower energy is converted into fluorescence at a position near the surface of the scintillator layer 322X in the low energy detector 32X, so that it is scattered/absorbed inside the scintillator layer, and hardly reaches the line sensor 324 in the low energy detector 32X and is hardly detected. On the other hand, an X-ray $X_M$ with medium energy comparatively higher than the energy of the low energy X-ray $X_L$ is converted into fluorescence at a deep position in the scintillator layer 322X in the low energy detector 32X, so that it is detected by the line sensor 324 in the low energy detector 32. Therefore, in the comparative example, it is difficult to express a contrast difference between substances composed of lightweight atoms (for example, meat and cartilage). Further, an energy difference between the X-rays detected by the low energy detector 32X and the X-rays detected by the high energy detector 42X is small, so that the effect of the subtraction operation becomes small.

On the other hand, as shown in FIG. 9(a), in the present embodiment, even when the low energy X-ray $X_L$ is converted into fluorescence at the surface of the scintillator layer 322 in the low energy detector 32, the fluorescence easily reaches the line sensor 324 in the low energy detector 32 and is easily detected because this scintillator layer 322 is thin. The medium energy X-ray $X_M$ is easily transmitted through the scintillator layer 322 of the low energy detector 32, so that X-rays to be detected by the low energy detector 32 are X-rays narrowed down to the lower energy side. Therefore, the X-ray absorbing effect of objects made of lightweight atoms can be increased, and a contrast difference between substances made of lightweight atoms (for example, meat and cartilage) is increased.

In addition, the medium energy X-ray $X_M$ transmitted through the low energy detector 32 is converted into fluorescence at the surface of the scintillator layer 422 of the high energy detector 42, so that the fluorescence is scattered/absorbed inside the scintillator layer 422 and hardly reaches the line sensor 324. On the other hand, the high energy X-ray $X_H$ is converted into fluorescence at a position near the line sensor 424, so that it is easily detected. Therefore, X-rays narrowed down to the higher energy side can be detected by the high energy detector 42.

Thus, by making thin the scintillator layer 322 of the low energy detector 32 and making thick the scintillator layer 422 of the high energy detector 42, clear detection energy discrimination is realized. Therefore, by making thin the scintillator layer 322 of the low energy detector 32 so that low energy X-rays are easily detected and making thick the scintillator layer 422 of the high energy detector 42 so that high energy X-rays are easily detected, a subtraction image with a distinctive contrast difference can be created even when foreign substances with various X-ray transmittances are present in a specimen.

Next, the synergistic effect of reduction in thickness of the scintillator layer 322 of the low energy detector 32 and an increase in the number of pixels of the line sensor 324 (that is, an increase in spatial resolution) is considered.

Scattering in the scintillator layer is influenced by the thickness, and is substantially at the same level as the thickness although it depends on the kind of the scintillator layer. Reduction in thickness of the scintillator layer limits the scattering range, so that a higher-resolution luminescence image can be obtained. At this time, reduction in pixel pitch of the line sensor to be combined with the thin scintillator layer is very useful with the scattering range reduction.

Based on the description given above, when spatial resolution is needed, reduction in thickness of the scintillator layer is preferable, however, when the scintillator layer is made thin, sufficient radiation absorbability cannot be secured and the radiation sensitivity becomes low. Therefore, for adapting the radiation detector to multi-energy, the inventors of the present invention carried out an experiment on relative sensitivity in the scintillator layer with respect to the thickness of the scintillator layer.

Figure 10:
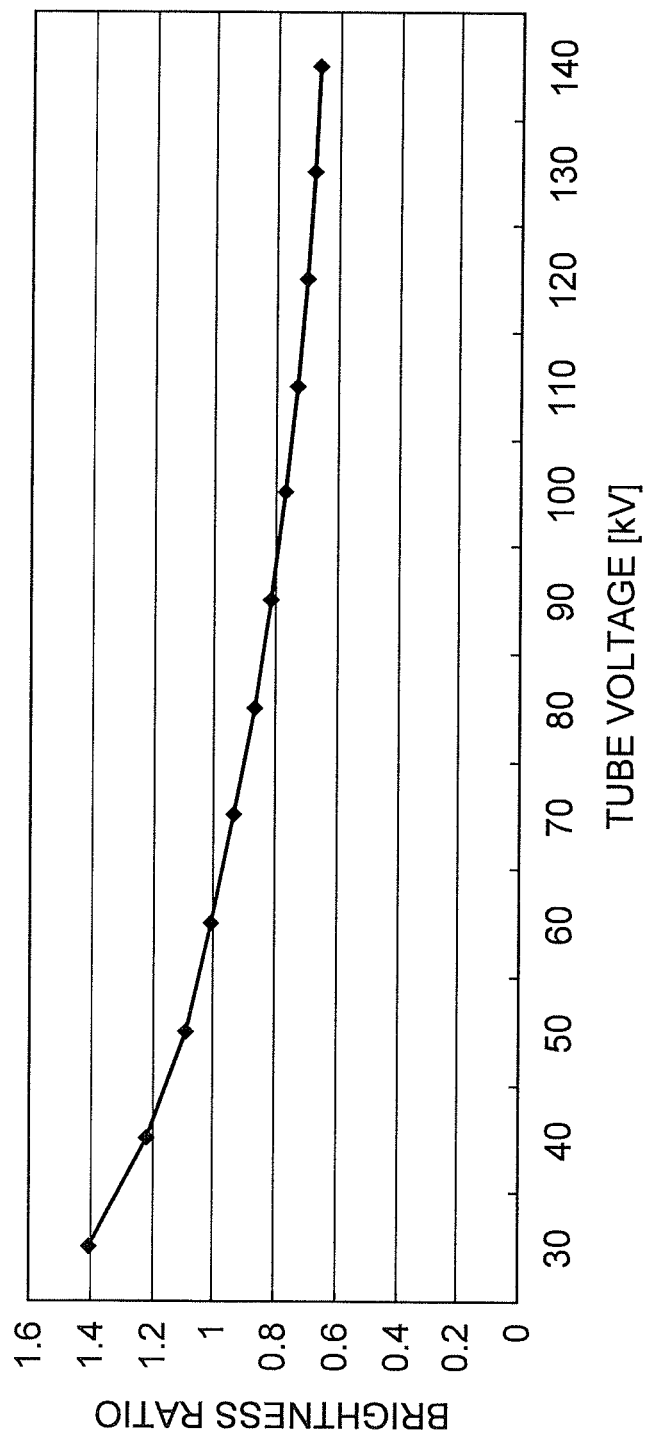
FIG. 10 is a diagram showing relative sensitivities in scintillator layers with different thicknesses.

FIG. 10 is a diagram showing relative sensitivities in scintillator layers with different thicknesses. Referring to FIG. 10, it was confirmed that, when the thickness of the scintillator layer was reduced to about a half, while the sensitivity to high energy X-rays with energies more than 60 kV was reduced, the sensitivity to low energy X-rays with energies of 60 kV or less was increased.

It is considered that low energy X-rays are absorbed and produce luminescence near the surface of the scintillator layer due to the energy permeability thereof. Absorption and luminescence near the surface are greatly influenced by scattering inside the scintillator layer, and the light amount is reduced by self-absorption of the scintillator layer, and as a result, the sensitivity is also reduced.

From the viewpoint of detection of low energy X-rays, the reduction in thickness of the scintillator layer suppresses light amount reduction, increases the sensitivity in the radiation detector, and reduces scattering inside the scintillator layer, so that a high-sensitivity and high-resolution transmission image can be obtained.

When a thin scintillator layer is used in a line sensor that is not adapted to multi-energy, sufficient radiation absorbability cannot be secured and the sensitivity to the high energy side is insufficient, however, by adapting the line sensor to multi-energy and using signals of the high-energy-side sensor, the performance of high sensitivity and high resolution can be utilized. Specifically, the problem in use of only the thin scintillator layer can be solved by adaptation to multi-energy.

The present invention is not limited to the present embodiment described above, but various modifications are possible.

Figure 11:
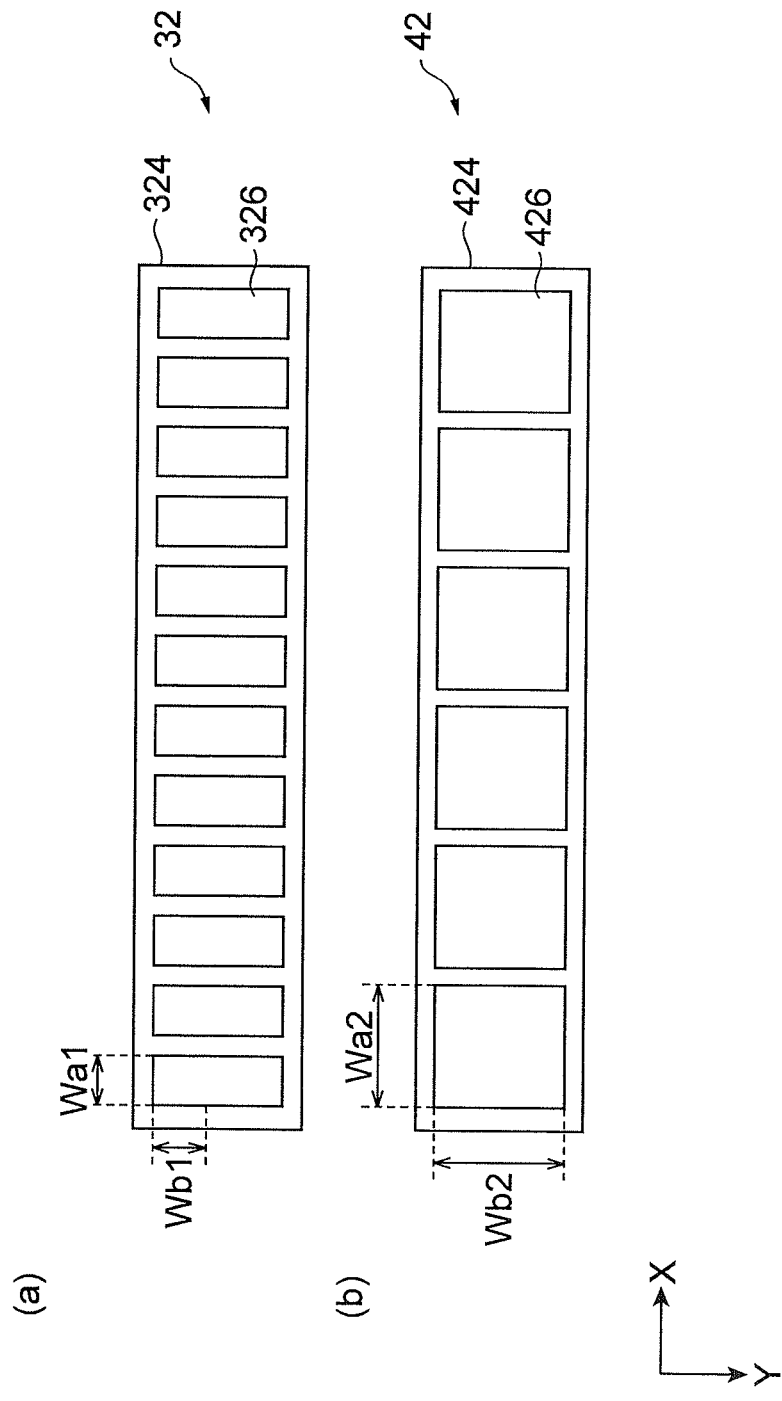
FIG. 11 is a drawing showing X-ray incidence planes of a low energy detector and a high energy detector in a dual energy sensor of an exemplary variation of the present invention.
Figure 12:
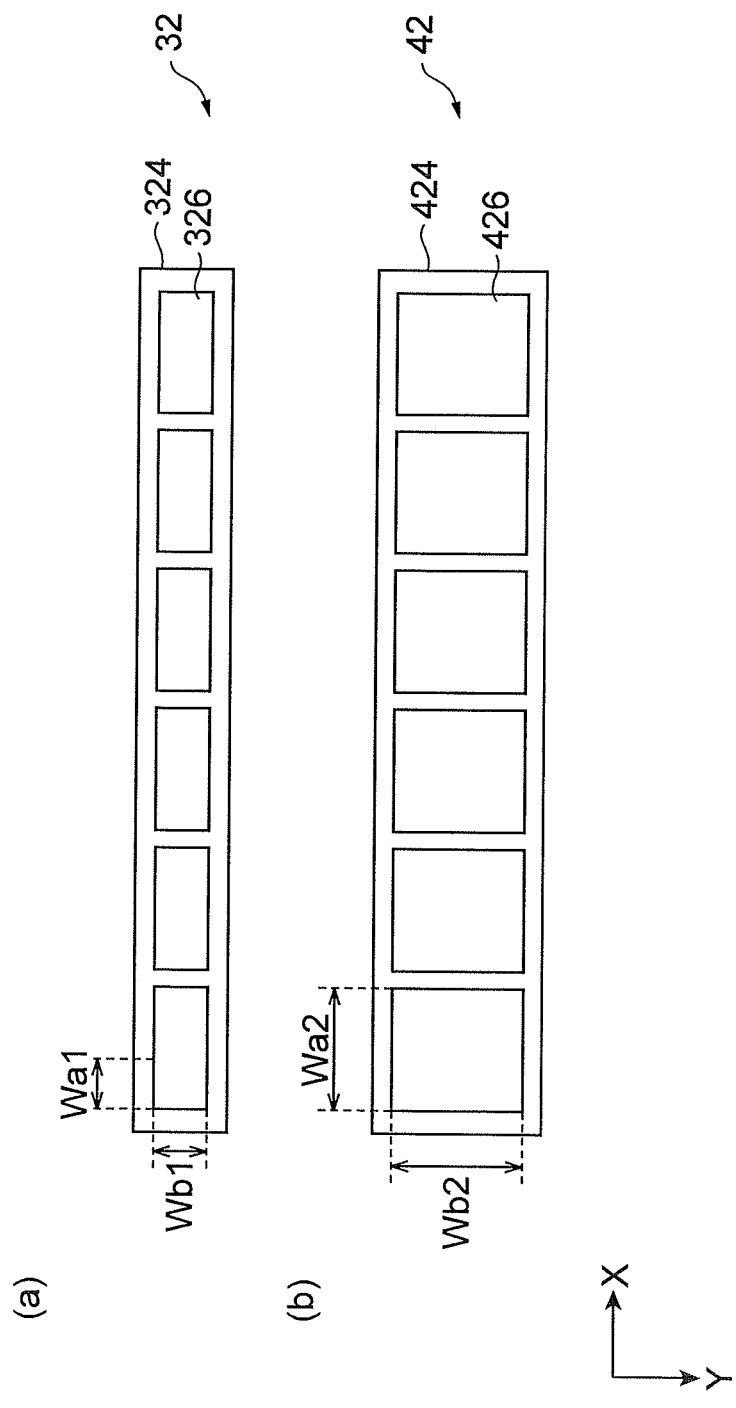
FIG. 12 is a drawing showing X-ray incidence planes of a low energy detector and a high energy detector in a dual energy sensor of another exemplary variation of the present invention.

In the present embodiment, to make the area S1 of each of the pixels 326 in the line sensor 324 of the low energy detector 32 smaller than the area S2 of each of the pixels 426 in the line sensor 424 of the high energy detector 42, the pixel width Wa1 of each pixel 326 is made smaller than the pixel width Wb2 of each pixel 426, and the pixel width Wb1 of each pixel 326 is made smaller than the pixel width Wb2 of each pixel 426, however, as shown in FIG. 11, the pixel width Wa1 may be made smaller than the pixel width Wa1. Even in this case, a difference in charge amount converted by each pixel can be made relatively large, and a contrast difference in a radiation image to be detected by the low energy detector can be increased. Further, the scintillator layer of the low energy detector is thin, so that crosstalk between pixels can be reduced even when the pixel width Wa1 in the detection direction X of each pixel 326 is reduced. As a result, the spatial resolution of the low energy detector can be increased, and a contrast difference in a radiation image to be detected by the low energy detector can be increased. Alternatively, as shown in FIG. 12, only the pixel width Wb1 may be made smaller than the pixel width Wb2. Even in this case, a difference in charge amount converted by each pixel can be made relatively large, and a contrast difference in a radiation image to be detected by the low energy detector can be increased.

Figure 13:
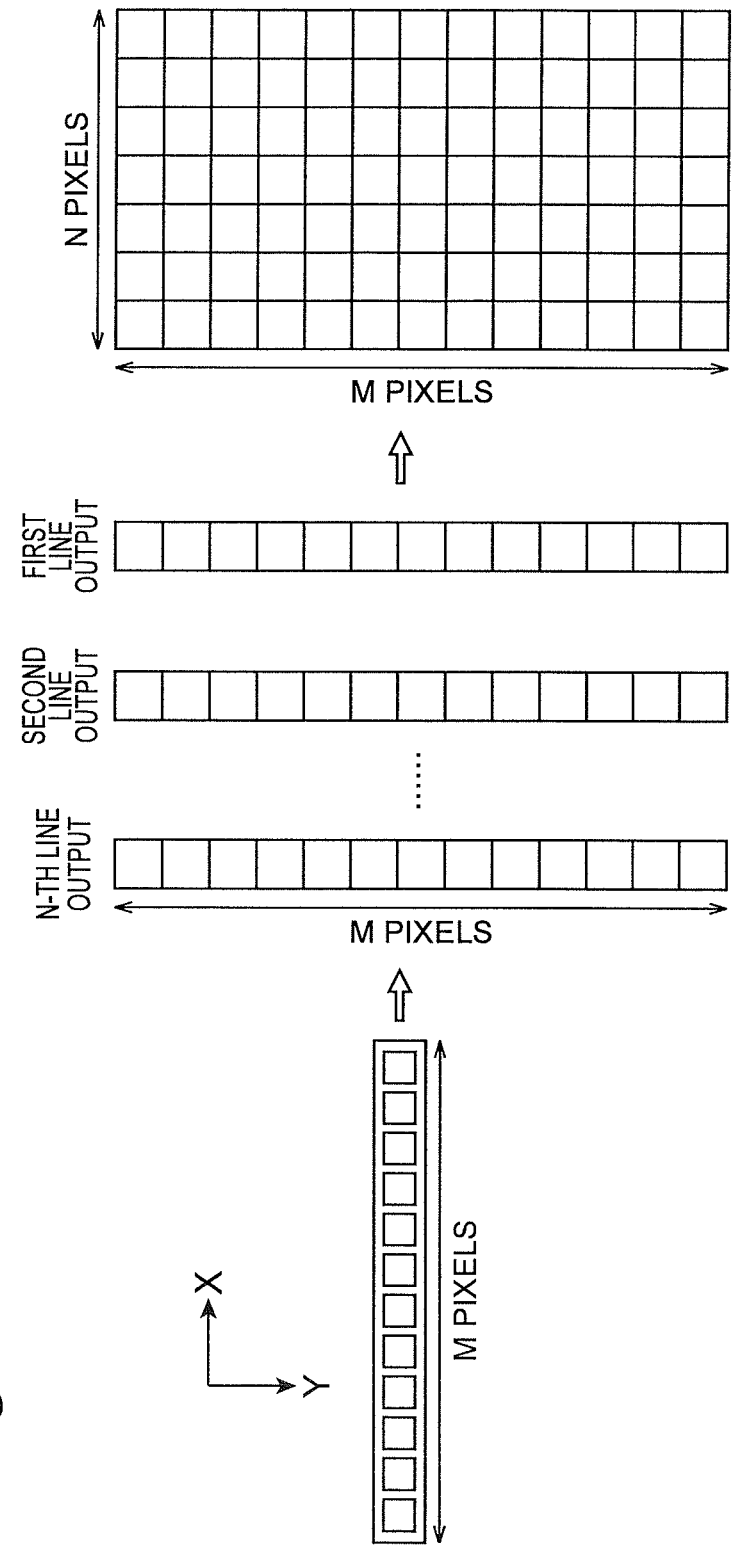
FIG. 13 is a schematic view showing an example of image processing of a dual-energy radiation detection device.

Here, signals output from the low energy detector and the high energy detector become one two-dimensional image as a result of image processing applied to, for example, M pixels (detection direction X)×N lines (conveying direction Y) as shown in FIG. 13. However, in the case where the pixel width Wa1<the pixel width Wa2 (FIG. 11), the numbers of pixels in the detection direction X are different, and in the case where the pixel width Wb1<the pixel width Wb2 (FIG. 12), the numbers of lines in the conveying direction Y are different, and in each of these cases, the accuracy of a subtraction image may be reduced. Therefore, when the numbers of pixels in the detection direction X or the numbers of lines in the conveying direction Y of the two radiation detectors are different from each other, image thinning-out processing is carried out in one radiation detector and image interpolation processing is carried out in the other radiation detector so that the numbers of pixels or the numbers of lines become equal to each other. Alternatively, detection timings of the two radiation detectors may be controlled so that the numbers of pixels or the numbers of lines become equal to each other.

INDUSTRIAL APPLICABILITY

The present invention is applicable to uses that increase a contrast difference in a radiation image in a low-energy range to be detected by a low energy radiation detector and increase a detection energy difference between the low energy radiation detector and a high energy radiation detector in a dual-energy radiation detection device.

REFERENCE SIGNS LIST

1 Dual-energy X-ray foreign substance inspection device
10 Belt conveyor
12 Belt portion
14 Belt conveyor control section
20 X-ray irradiator
30 Low energy image acquisition section
32 Low energy detector (first radiation detector)
322 Low energy scintillator layer (first scintillator layer)
324 Low energy line sensor (first pixel section)
326 Pixel
34 Low energy image correction section
34a Amplifier
34b A/D converter
34c Correction circuit
34d Output interface
40 High energy image acquisition section
42 High energy detector (second radiation detector)
422 High energy scintillator layer (second scintillator layer)
424 High energy line sensor (second pixel section)
426 Pixel
44 High energy image correction section
44a Amplifier
44b A/D converter
44c Correction circuit
44d Output interface
50 Timing control section
70 Image processing device
80 Radiation detection device
86 Dual-energy sensor

The invention claimed is:

1. A radiation detection device for a foreign substance inspection using a subtraction method, which detects radiation in a first energy range and radiation in a second energy range higher than the radiation in the first energy range that are transmitted through a specimen and incident from a radiation incident direction, comprising:
a first radiation detector that is positioned on the upstream side with respect to the radiation incident direction and detects radiation in the first energy range; and
a second radiation detector that is positioned on the downstream side with respect to the radiation incident direction and detects radiation in the second energy range, wherein
the first radiation detector includes a first scintillator layer that extends along an image detection direction and converts an image of radiation in the first energy range into an optical image, and a first pixel section that has a plurality of pixels arrayed along the image detection direction and acquires a first image based on the optical image converted by the first scintillator layer,
the second radiation detector includes a second scintillator layer that extends along the image detection direction and converts an image of radiation in the second energy range into an optical image, and a second pixel section that has a plurality of pixels arrayed along the
image detection direction and acquires a second image based on the optical image converted by the second scintillator layer,
the thickness of the first scintillator layer is smaller than the thickness of the second scintillator layer,
a first area of each of the plurality of pixels in the first pixel section is smaller than a second area of each of the plurality of pixels in the second pixel section, and
a number of pixels of the first pixel section is greater than a number of pixels of the second pixel section and the pixel pitch of the pixels in the second pixel section is n times the pixel pitch of the pixels in the first pixel section, where n is a positive integer.

2. The radiation detection device according to claim 1, wherein
a first image detection direction width in the image detection direction of each of the pixels in the first pixel section is smaller than a second image detection direction width in the image detection direction of each of the pixels in the second pixel section.

3. The radiation detection device according to claim 1, wherein
a first orthogonal direction width in an orthogonal direction orthogonal to the image detection direction of each of the pixels in the first pixel section is smaller than a second orthogonal direction width in the orthogonal direction of each of the pixels in the second pixel section.

4. The radiation detection device according to claim 1, wherein
a material of the first scintillator layer and a material of the second scintillator layer are the same.

5. The radiation detection device according to claim 1, wherein
a material of the first scintillator layer and a material of the second scintillator layer are different.

6. The radiation detection device according to claim 1, wherein the first image that is acquired by the first pixel section has a greater resolution than the second image that is acquired by the second pixel section.

* * * * *